J. T. JACKSON.
METER BOX.
APPLICATION FILED JAN. 22, 1912.
1,038,146.
Patented Sept. 10, 1912.
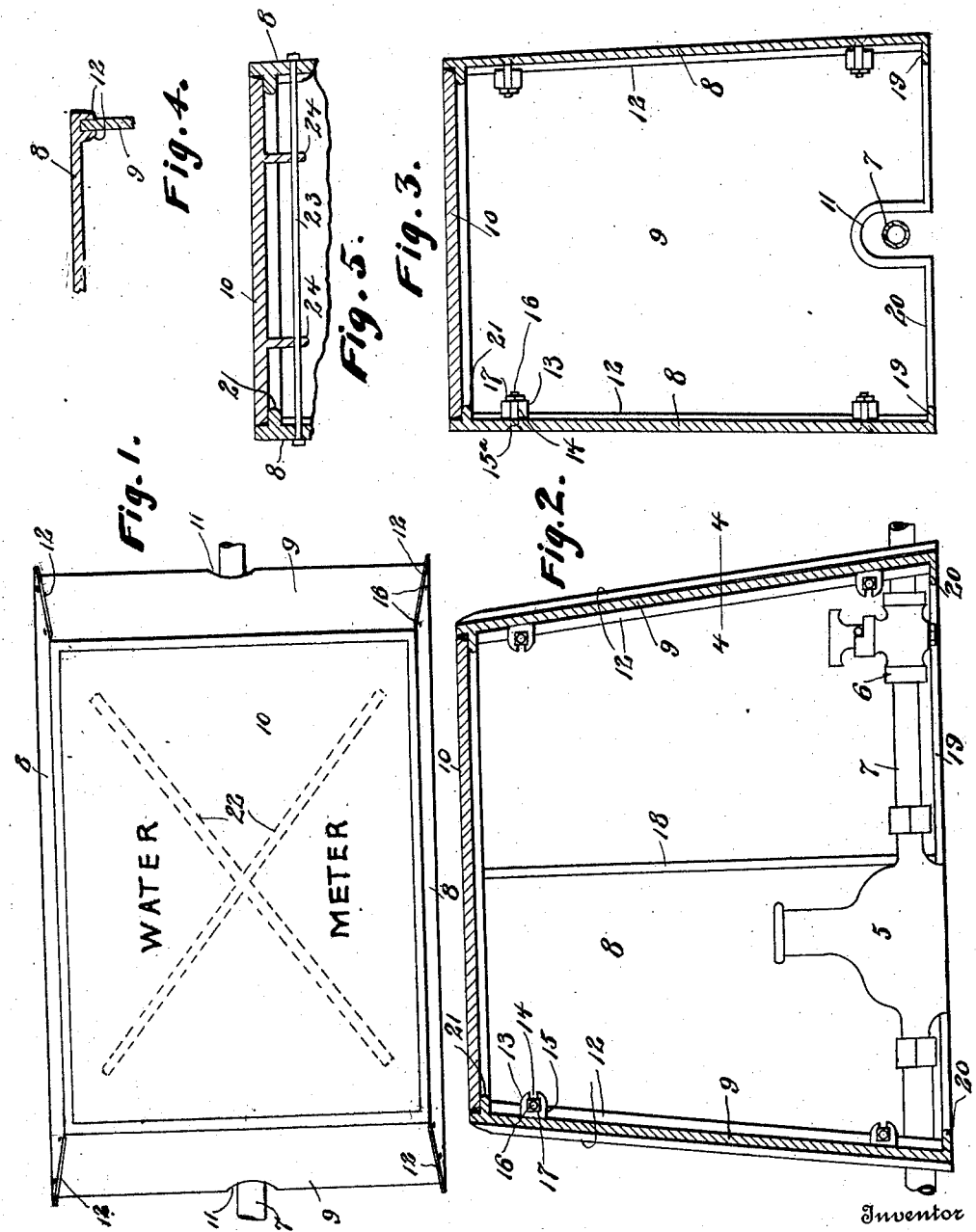
Witnesses
G. L. Neidman
J. Miller
Inventor
John T. Jackson
By Max A. Schmidt
Attorney

UNITED STATES PATENT OFFICE.

JOHN T. JACKSON, OF EL RENO, OKLAHOMA.

METER-BOX.

1,038,146.

Specification of Letters Patent.   Patented Sept. 10, 1912.

Application filed January 22, 1912.   Serial No. 672,661.

*To all whom it may concern:*

Be it known that I, JOHN T. JACKSON, a citizen of the United States, residing at El Reno, in the county of Canadian and State of Oklahoma, have invented certain new and useful Improvements in Meter-Boxes, of which the following is a specification.

The box which is the subject of the present invention is designed more particularly to serve as a housing for water meters, stop-cocks, and other water appliances located under ground, and its object is to provide a strong, durable and cheap box which is in sections so that it can be shipped in knock-down form, and also to provide improved means for securing the sections together whereby they may be easily and quickly assembled.

With these objects in view, the invention consists in a novel construction and an arrangement of parts to be hereinafter described and claimed, reference being had to the accompanying drawing in which—

Figure 1 is a plan view of the box; Fig. 2 is a longitudinal section; Fig. 3 is a vertical section; and Fig. 4 is a sectional detail on the line 4—4 of Fig. 2. Fig. 5 is a sectional view showing a cover fastening.

Referring specifically to the drawing, 5 denotes the water meter which is to be inclosed in the box which is the subject of the present invention. The box also incloses a cut-off or stop-cock 6, and is constructed so as to accommodate the pipe 7 to which the meter and the stop-cock are connected.

The box comprises side walls 8, end walls 9, and a top or cover 10. The box is open at the bottom, and in the end walls, at the bottom thereof, are recesses 11 so that the box may be slipped down over the meter and the stop-cock, the pipe 7 passing through the recesses.

On the inner face of the side walls, at each end thereof, are two parallel vertical ribs 12 which are spaced apart so as to form a groove in which the end walls are held, the vertical edges of said walls extending between the ribs. On the inner face of each end wall, near the top and bottom thereof, are lugs 13 having a slot 14. These lugs are adjacent to the vertical edges of the side walls and extend through recesses 15 in the innermost ones of the ribs 12 so as to come close to the inner face of the side walls. In the side walls are apertures $15^a$ which register with the slots 14 when the walls are assembled. Bolts 16 passing through the slots and apertures, and secured by nuts 17 inside the box, fasten the four walls thereof together.

On the inner face of each side wall 8 is a reinforcing rib 18, and on the bottom of said wall is an inside bead 19. A similar bead 20 is formed on the bottom of the end walls, said bead also extending around the recesses 11. The side and end walls also have an internal ledge 21 near the top, which extends entirely around the box on the inside thereof and on which the cover 10 is supported, said cover resting loosely on the ledge. On the bottom of the cover are strengthening ribs 22. The ledge 21 may also serve to support an extension if a box of greater height is required.

The structure herein described can be easily and quickly assembled, and as the walls are separable, the box can be shipped in knock-down form, thus saving space and reducing the expense of shipment. The parts can be cheaply made by being cast, and no machine work of any kind is required.

The cover 10 may be fastened in place by means of a bolt 23 passing through apertures in the side walls 8 and through eyes in lugs 24 on the bottom of the cover, as shown in Fig. 5.

I claim:

1. A box comprising separable side and end walls, and a cover, said side walls having spaced parallel vertical inwardly directed ribs adjacent to each end, and the end walls fitting at their ends between said ribs, the innermost ones of the ribs having recesses, and the end walls having internal lugs passing through said recesses, said lugs having openings, and the side walls having apertures which register with said openings, and fastening means passing through said registering openings and apertures.

2. A box comprising separable side and end walls having an internal ledge at the top thereof, and a cover supported on the ledge, said side walls having spaced parallel vertical inwardly directed ribs adjacent to each end, and the end walls fitting at their ends between said ribs, the innermost ones of the ribs having recesses, and the end walls having internal lugs passing through said recesses, said lugs having openings, and the side walls having apertures which register with said openings, and fastening means passing through said registering openings and apertures.

In testimony whereof I affix my signature in presence of two witnesses.

JOHN T. JACKSON.

Witnesses:
 HARRY JENSEN,
 DAYTON MUNSELL.

Copies of this patent may be obtained for five cents each, by addressing the "Commissioner of Patents, Washington, D. C."